United States Patent
Bell

(10) Patent No.: US 6,272,506 B1
(45) Date of Patent: *Aug. 7, 2001

(54) COMPUTERIZED VERIFICATION FORM PROCESSING SYSTEM AND METHOD

(75) Inventor: Lewis Bell, Walpole, MA (US)

(73) Assignee: Doxis, LLC, Norwood, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/928,686

(22) Filed: Sep. 12, 1997

(51) Int. Cl.$^7$ ..................................................... G06F 17/30
(52) U.S. Cl. ........................ 707/507; 707/505; 707/506; 707/9
(58) Field of Search ................................. 707/9, 10, 100, 707/102–104, 500–507, 508, 509, 526, 517; 345/326–433

(56) References Cited

U.S. PATENT DOCUMENTS

| | | | |
|---|---|---|---|
| 5,325,478 | * | 6/1994 | Shelton et al. ........................ 707/507 |
| 5,606,609 | * | 2/1997 | Houser et al. ............................. 380/4 |
| 5,710,887 | * | 1/1998 | Chelliah et al. ..................... 345/226 |
| 5,813,009 | * | 9/1998 | Johnson et al. ...................... 707/100 |

* cited by examiner

Primary Examiner—Hosain T. Alam
Assistant Examiner—Alford W. Kindred
(74) Attorney, Agent, or Firm—Kirk Teska; Iandiorio & Teska

(57) ABSTRACT

A computerized form processing system including a database for storing at least one form having one or more fields; a viewer for viewing a stored form; a data entry device for entering information into the fields of a form; programming for monitoring whether the information in a field has changed and for automatically flagging any changes to the information entered into a field.

32 Claims, 15 Drawing Sheets

Microfiche Appendix Included
(1 Microfiche, 70 Pages)

| PRODUCT | | | | 10 |
|---|---|---|---|---|
| CODE | DATE OF MFG. | BATCH SIZE AFTER ADJ'MT | DATE REC'D LAB | |
| | PROPERTY | SPECIFICATION LIMITS | RESULTS Pass Fail | |
| 321A | COLOR | WHITE, AS PER STANDARD | O  O | |
| 321B | ODOR | AS PER STANDARD | O 12 O | |
| 321C | APPEARANCE | FIRM CREAM | O  O | |
| 0019 | PH 3.6 TO 40 (25 DEG C) | 3.6  3.8  kt — 14 | | |
| 011B | VISCOSITY | | | |
|  NOTE01 | | | | |
|   INITIAL: | | | | |
|    TC @ 5 RPM 20 TO 40 BSU (30 DEG C) | | | | |
|   2 HOUR: | | | | |
| 011B | VISCOSITY | | | |
|   TD @ 5 RPM 20 TO 30 BSU (25 DEG C) | | | | |
|   TD @ 5 RPM 35 TO 55 BSU (25 DEG C) | | | | |

| PRODUCT | | | 10 |
|---|---|---|---|
| CODE | DATE OF MFG. | BATCH SIZE AFTER ADJ'MT | DATE REC'D LAB |

|  | PROPERTY | SPECIFICATION LIMITS | RESULTS Pass Fail |
|---|---|---|---|
| 321A | COLOR | WHITE, AS PER STANDARD | ○   ○ |
| 321B | ODOR | AS PER STANDARD | ○ 12 ○ |
| 321C | APPEARANCE | FIRM CREAM | ○   ○ |
| 0019 | PH 3.6 TO 40 (25 DEG C) | 3.6   3.8  kt | —14 |
| 011B | VISCOSITY |  |  |

NOTE01
   INITIAL:
      TC @ 5 RPM 20 TO 40 BSU
         (30 DEG C)
   2 HOUR:

011B    VISCOSITY
      TD @ 5 RPM 20 TO 30 BSU
        (25 DEG C)
      TD @ 5 RPM 35 TO 55 BSU
        (25 DEG C)

*FIG. 1*

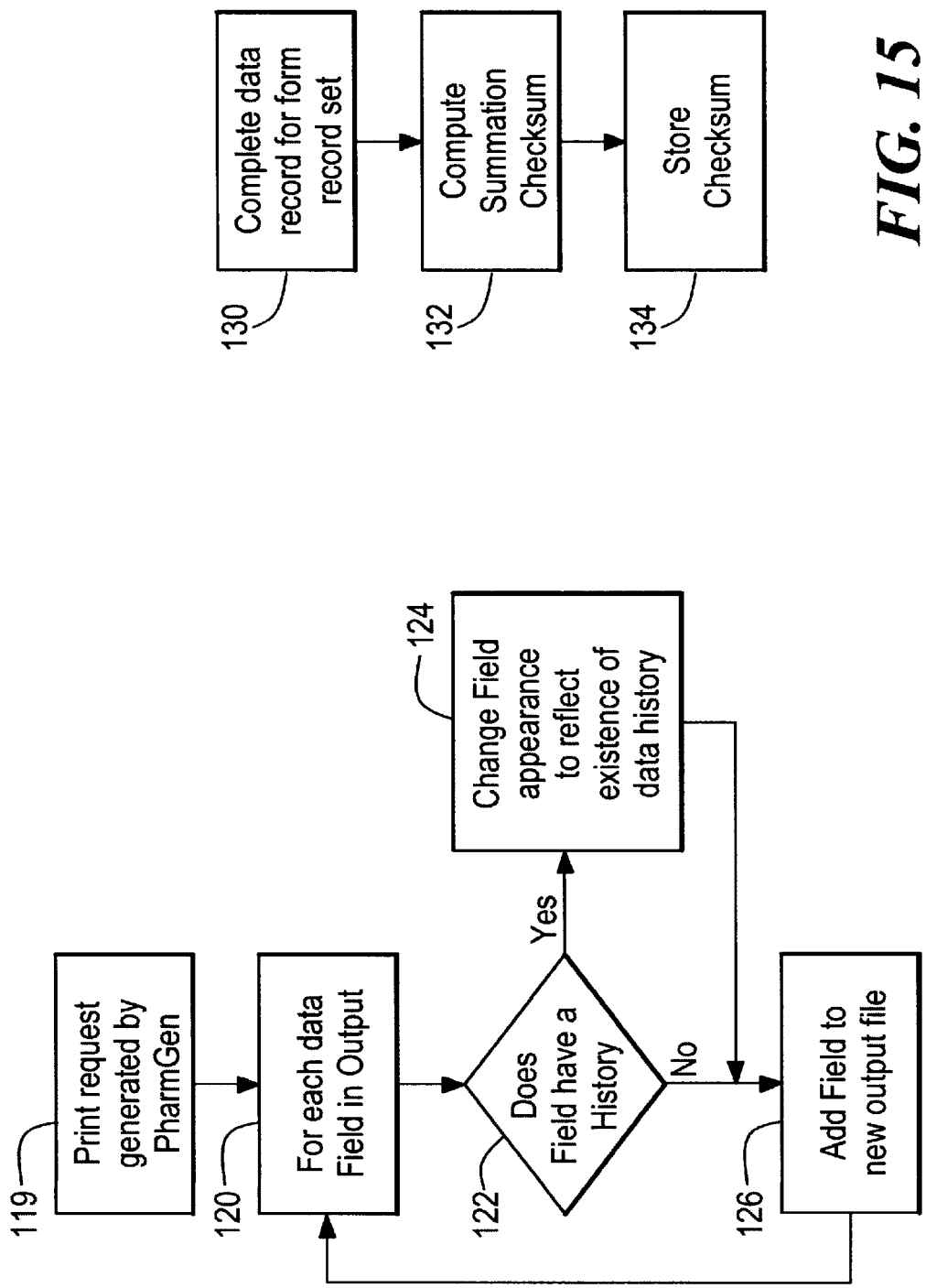

COMPUTERIZED VERIFICATION FORM PROCESSING SYSTEM AND METHOD

FIELD OF INVENTION

This application contains a microfiche appendix consisting of 1 sheet and 70 frames.

This invention relates to a computerized form processing system and method which provides an automatic and positive audit trail of changes made to data entries in electronic forms.

BACKGROUND OF INVENTION

The benefits of computerized forms as compared to paper forms are numerous. Data entry is easier and faster, paper costs are reduced, storage space is optimized, retrieval is faster, and data integrity is ensured. Moreover, because of the use of database and spreadsheet technology, reports concerning data entered on the forms can be generated much faster and even automatically. Configuration control is also made easier. Finally, when a computer network is used, data entry can be monitored in real time and multiple users can access a given form and its data simultaneously.

In contrast, when paper forms are used, data entry is slow, the paper version of the form plus the required copies take up an inordinate amount of storage space, and retrieval of paper forms requires a manual filing system. Report generation involves manually going through a number of completed forms to extract the required data. Finally, a manual configuration control system must be implemented.

Computerized forms overcome these and many other disadvantages of paper forms. Still, computerized forms do suffer from some shortcomings. For example, computers typically handle data entry changes by completely eliminating the old values and replacing them with the most current values. For example, if the value of 25 is typed into a field of a spreadsheet or database and then this value is replaced by the value 26, there will be no record of the old value 25 using current electronic form generation products.

This deficiency in computerized databases and spreadsheets has severely affected the implementation of computerized forms in some industries. For example, the Food and Drug Administration (FDA) has issued regulations which require pharmaceutical companies and other companies regulated by the FDA to cross out an incorrect data entry so that it can still be read and also require data entry personnel to initial or sign in association with the change. Similar rules apply in many diverse industries, including data recording requirements for military testing and inspection procedures and medical patient records. The reason for these cross out and initial or sign procedures is to provide a clear audit trail for evaluation purposes should a drug, military device, or medical procedure fail to perform as specified or worse, harm individuals or groups of individuals.

As delineated above, currently known computerized paperless form generation systems cannot implement this cross out and initial requirement because, by their very nature, computers allow changes to be made to data without keeping a record of the data changes. Indeed, one of the advantages of computerized data entry is the ease of making changes. Another problem with computerized forms is the unusual ease with which unauthorized modifications can be made. Since all of the data, the form itself, and even any electronic or digital biometric signatures associated with the form are really just stored computer records, unauthorized access to these records can be made despite security algorithms and changes or modifications can be made severely affecting the integrity of the data. For example, pharmaceutical company personnel facing an investigation and/or a lawsuit, may retrieve old records and improperly change certain data entries to escape culpability and/or liability.

Accordingly, the change from paper based forms to computerized forms has not been implemented in some industries as quickly as desired and one regulatory agency, namely the FDA, closely scrutinizes any attempt to computerize the standard operating procedures ("SOP") batch form used by pharmaceutical companies to keep a record of pharmaceutical manufacturing processes.

SUMMARY OF INVENTION

It is therefore an object of this invention to provide an improved computerized form processing system and method.

It is a further object of this invention to provide such a system and such a method which automatically keeps track of all data entry changes.

It is a further object of this invention to provide such a system and such a method which complies with FDA requirements concerning data entry changes.

It is a further object of this invention to provide such a system and such a method which automatically flags a changed entry and which allows the user to initialize the change in accordance with the FDA's requirements.

It is a further object of this invention to provide such a system and such a method which allows authorized users to effect a change by entering new data and then initialing or signing the new entry via a digital biometric signature or initial capture or by electronic signatures that require two separate identifiers in accordance with FDA requirements. In such a case it is an object of this inventions to automatically flag the changed entry so that it is visibly different from an unchanged entry, both on the computer screen and on the printed (output) form, as well as in exception reports.

It is a further object of this invention to provide such a system and such a method which provides a clear audit trail of all data entry events associated with a paperless form.

It is a further object of this invention to provide such a system and such a method which automatically verifies the integrity of stored completed forms.

This invention results from the realization that a computerized form processing system which complies with current good manufacturing procedures thereby providing an audit trail for authorized changes to data entered on computerized forms can be implemented by a unique routine or set of routines which automatically monitor whether a value is changed after it is first entered into the form and, if so, requires the user to authorize the change by sign off before the changed value will be accepted, and which then flags the changed value and stores the previous value, the changed value, the user's initials, and the date and time each value was entered. Both in the application screens, and during output (e.g. printout), the fact that a change was made to a value is automatically made apparent to the reviewer.

This invention results from the further realization that if field check sums of all values entered on a computerized form are performed as the form is being completed and then a final summation checksum if performed after the form is completed, then later if any unauthorized changes are made, the check sum values will be different thereby providing a verification to ensure that stored data is not corrupted. Any subsequent access to the form will result in recalculation of the summation checksum, and comparison of that value with the previously stored value. If there is a discrepancy, access will be denied, and an error report will be generated.

This invention features a computerized form processing system comprising: a database for storing a form including one or more fields; a viewer for viewing a stored form; a data entry device for entering information into the fields of a form; means for monitoring whether the information in a said field has changed; and means for automatically flagging any changes to the information entered into a field.

All the information entered into a field including all revisions, are automatically stored in a database. The viewer is preferably a touch screen and then the data entry device includes a pen device.

Further included may be a field modification verification routine for authorizing a change to information entered into a field. This routine includes means for displaying a signature block on the screen and means for verifying that an authorized entry is made to the signature block. The field modification verification routine further includes means for resetting the field to reflect the previous information entered into the field if the signature block is not properly completed. This invention also features means for performing a summation check for the information entered into a form and means for storing a checksum value representing that information for monitoring changes made to completed forms.

The computerized form processing system of this invention includes a database for storing a form including one or more fields; a viewer for viewing a stored form; a data entry device for entering information into the fields of the form; means for monitoring whether the information in a field has changed; means for automatically flagging any changes to the information entered into a field; and means for automatically storing, in the database, the original information entered into the fields of the form and all changes made to the information.

In another embodiment, there is a database for storing at least one form including one or more fields; a viewer for viewing a stored form; a data entry device for entering information into the fields of the form; means for monitoring whether the information in a field has changed; means for automatically flagging any changes to the information entered into a field; and field modification verification means for authorizing changes to information entered into a field.

In another embodiment, the computerized form processing system of this invention includes a database for storing at least one form including one or more fields; a viewer for viewing a stored form; a data entry device for entering information into the fields of the form; means for monitoring whether the information in a field has changed; means for automatically flagging any changes to the information entered into a field; means for performing a summation check for the information entered into a form; and means for storing the resulting checksum value of the information for monitoring changes made to completed forms.

The computerized form processing method of this invention features the steps of establishing a database including at least one stored form including one or more fields; monitoring whether the information entered into a field has changed; and automatically flagging any changes to the information entered into a field.

The method further includes the steps of automatically storing, in the database, all the information entered into a field; requiring an authorization for any changes made to information already entered into a field; displaying a signature block and verifying that an authorized entry is made to the signature block; and automatically resetting the field to reflect the previous information entered into the field if the signature block is not properly completed. In the preferred embodiment, further included is the step of performing a summation check for the information entered into a form and storing the resulting checksum value representing the information for monitoring changes made to completed forms.

DISCLOSURE OF PREFERRED EMBODIMENT

FIG. 1 is a view of a prior art paper form showing compliance with the cross out and initial requirements imposed on many industries;

FIG. 14 is a flow chart of the computer programming of this invention depicting the processing which occurs when a form record is requested for output, for example by printing a hard copy of a completed form;

FIGS. 15–16 are flow charts depicting the operation of the summation check data integrity function of the subject invention.

Figure 2:
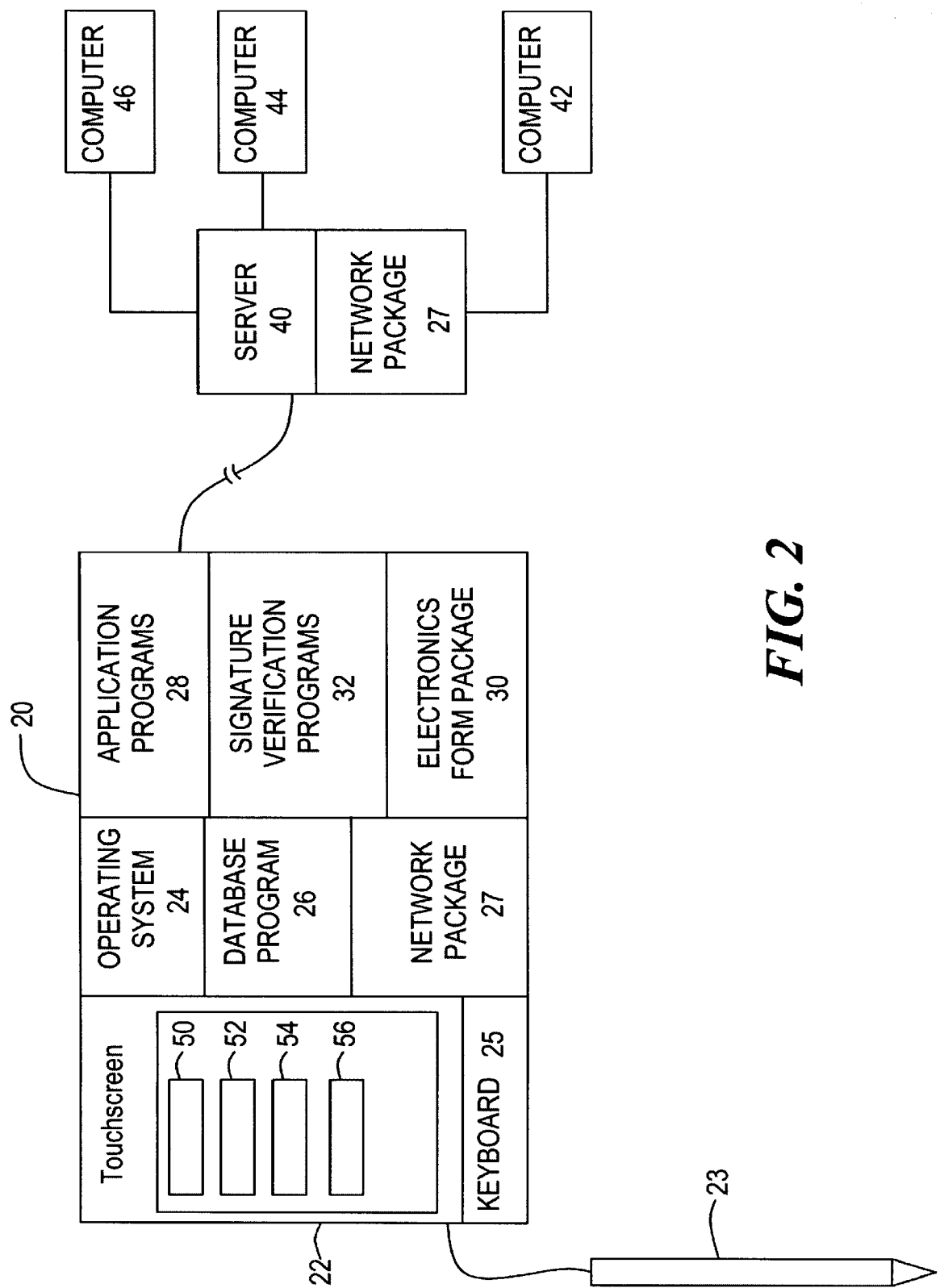
FIG. 2 is a block diagram showing the primary components of the computerized form processing system of this invention.

As delineated in the Background of the Invention above, paper forms are still used in some industries such as batch control form 10, FIG. 1, used to record various data about a chemical compound including its color as shown at data entry record field 12 and the PH level as shown in field 14. As used herein, a form is defined as collection of data regarding a transaction (e.g. a manufacturing process or medical patient records) required to be kept as a record. One reason such paper forms are still used is that current regulations require that when changes made to a data entry, for example a change from 3.6 to 3.8 in PH field entry 14, the old value (here 3.6) must be crossed out so that it can still be read and understood, and the new value then recorded, (here 3.8), and the entry of the initials or other FDA compliant user identifiers of the technician entering the data. Such mistakes tend to occur, for example, when the technician misreads a value indicated on a PH metering device.

The reasons for these regulations and this long standing practice is so that an audit trail is maintained concerning what was changed, who made the change, and who authorized the change, see field 15, FIG. 1.

After completion, batch control form 10 is stored in a file for later review and/or report generation where, for example, the PH level for several batches may be reviewed for trend analysis.

One reason many of these types of forms are not computerized, as discussed in the Background of the Invention above, is that most prior art form generation computer programs automatically delete old values when a new data entry value is entered into a field and no indication is made that a change was ever effected. Note that paper form 10 reveals two pieces of important information: first, that a change was made to the PH level reading and, second, that the old or original value was 3.6. In contrast, currently known computerized data entry programs fail to show that a change was ever made nor do they keep a record of previously entered values. Although some programs may have an "exception report" capability, there is no indication provided on the completed form that a change was ever effected, there is no indication concerning who made or authorized the change, and the exception report must be manually requested each time it is to be analyzed.

In this invention, however, computerized form processing system 20, FIG. 2, automatically flags the occurrence of a value change, requires the data entry technician to sign or initial the change or employ an FDA compliant electronic signature, records the technician's biometric digital signature or electronic signature, keeps a record of all previous entries for audit purposes, and automatically provides a printout which indicates whether values were changed when the form was in the process of being completed or afterward.

Indeed, in the preferred embodiment, if the technician does not initial the change, the value in the field is automatically changed back to its previous value thus preventing the entry of unauthorized changes. Moreover, a check sum calculation is automatically performed by system 20 for all data entered into a computerized form as the data is entered into each field (field checksum) and then after the form is completed (final checksum). In this way, if at some later date an unauthorized change is made to the data in a stored form, the summation check sum value for the revised form will be different from the original checksum value allowing authorities to verify the originality and integrity of the data on all stored forms. The field checksum is automatically generated for each field in a form and if an individual field has a history, each entry into that field (i.e., the original entry and any and all subsequent entries) has its own unique data record created and a checksum generated for its value, date, time of entry, and the user specific identifier, such as initials or a signature. These field checksum values are stored in the database for future reference in case of audit. When a given form is completed, a final checksum for the entire form record set (ie, data and form template) is automatically generated, using all individual field checksums. This final checksum value is also stored in the database.

System 20 includes touch screen 22, touch pen 23, operating system 24 such as Windows 95®, database program 26 such as SQL Server,® application program block 28 written in, for example, Visual Basic, electronic form package 30 such as the "Jet Form" product, and signature verification program 32 such as CIC Ink Tools®

In a distributed system, system 20, operating for example on a hardware platform such as the Fujitsu pen based hand held computer model "Stylistic 1000" may be connected and/or interfaced with server 40 via wireless technology so that system 20 operates as an electronic "clipboard" which the technician carries around the manufacturing facility. Server 40 is then connected to "clients" 42, 44, and 46. Accordingly, database program 26 and the other programs may actually reside, in whole or in part, on server 40. Spread Spectrum Radio Network package 27 including the appropriate hardware and software residing on system 20 and server 40 enables system 20 to communicate with server 40 and vice versa. Alternatively, system 20 could be hard wired to server 40 and/or and other kind of communication links could be used, e.g. satellite transmissions.

Database program 26 stores the form used at a specific manufacturing facility as generated by electronic form generation package 30. Pen 23 in combination with touch screen 22 and keyboard 25 act as a data entry device for all data entered into fields 50, 52, 54, and 56 of form 60 displayed on viewing means such as screen 22. Database program 26 stores the values entered by the user in fields 50 through 56 of form 60 and all completed forms. As discussed with reference to FIGS. 3 through 14, application program group 28 includes means for monitoring whether there has been a change to the information entered in a given field, and means for automatically flagging any such changes. Application program group 28 in conjunction with database program 20 also includes means for automatically storing in a database all values entered into a field so that a permanent record is kept of all previous values.

A field modification routine of application program group 28 which interfaces with signature verification program 32 is programmed to monitor when a change is made to data previously entered into a field and then to automatically display a signature block which must be completed before a change will be received. Otherwise, this routine does not allow the change to be made and the data is reset to its original value. Finally, an output routine automatically provides an indication to the reviewer whether or not a given value has been changed. If the change is accepted a character such as a tilde is added to the field on the screen and on the printout to modify its appearance As discussed in more detail with reference to FIGS. 15–16, application program group 28 also includes checksum routines that perform a summation check on all the data entered as a given form is completed. In this way, if unauthorized changes are later made to a completed form stored in database 26, when the checksum is again performed, the resulting value will be different providing a clear indication that an unauthorized change was made to data recorded on the form.

Figure 3:
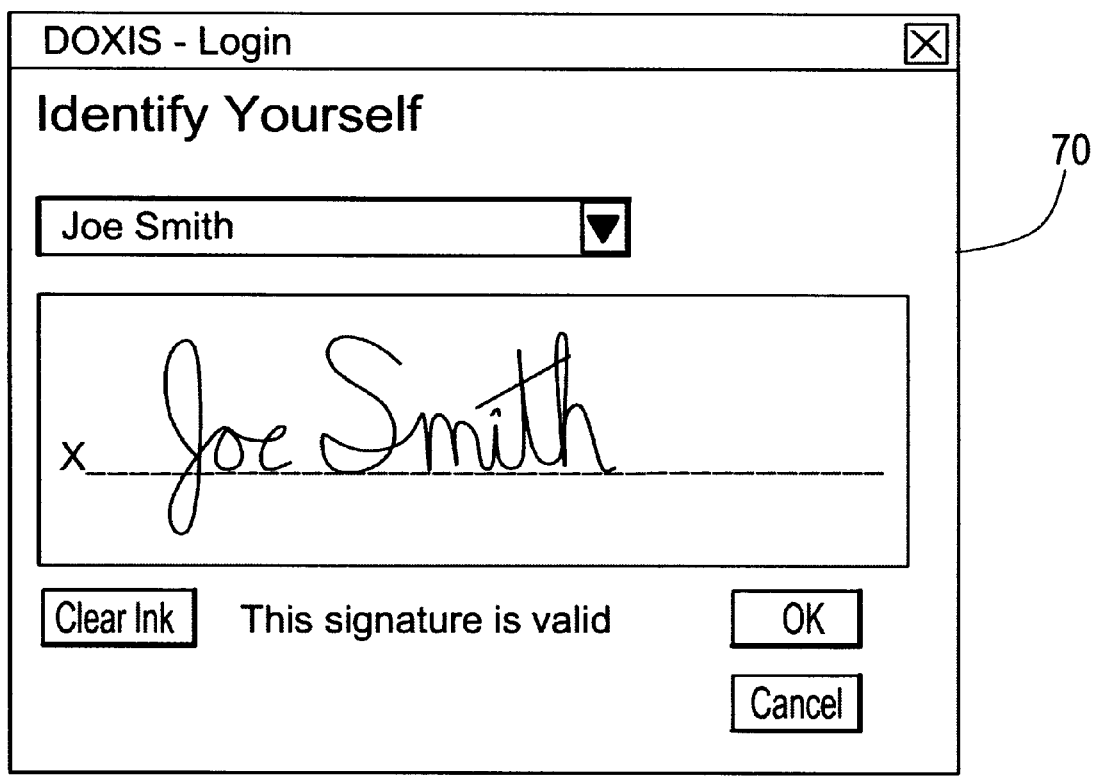
FIG. 3 is a view of a sign on screen allowing the user to access the system shown in FIG. 2.
Figure 4:
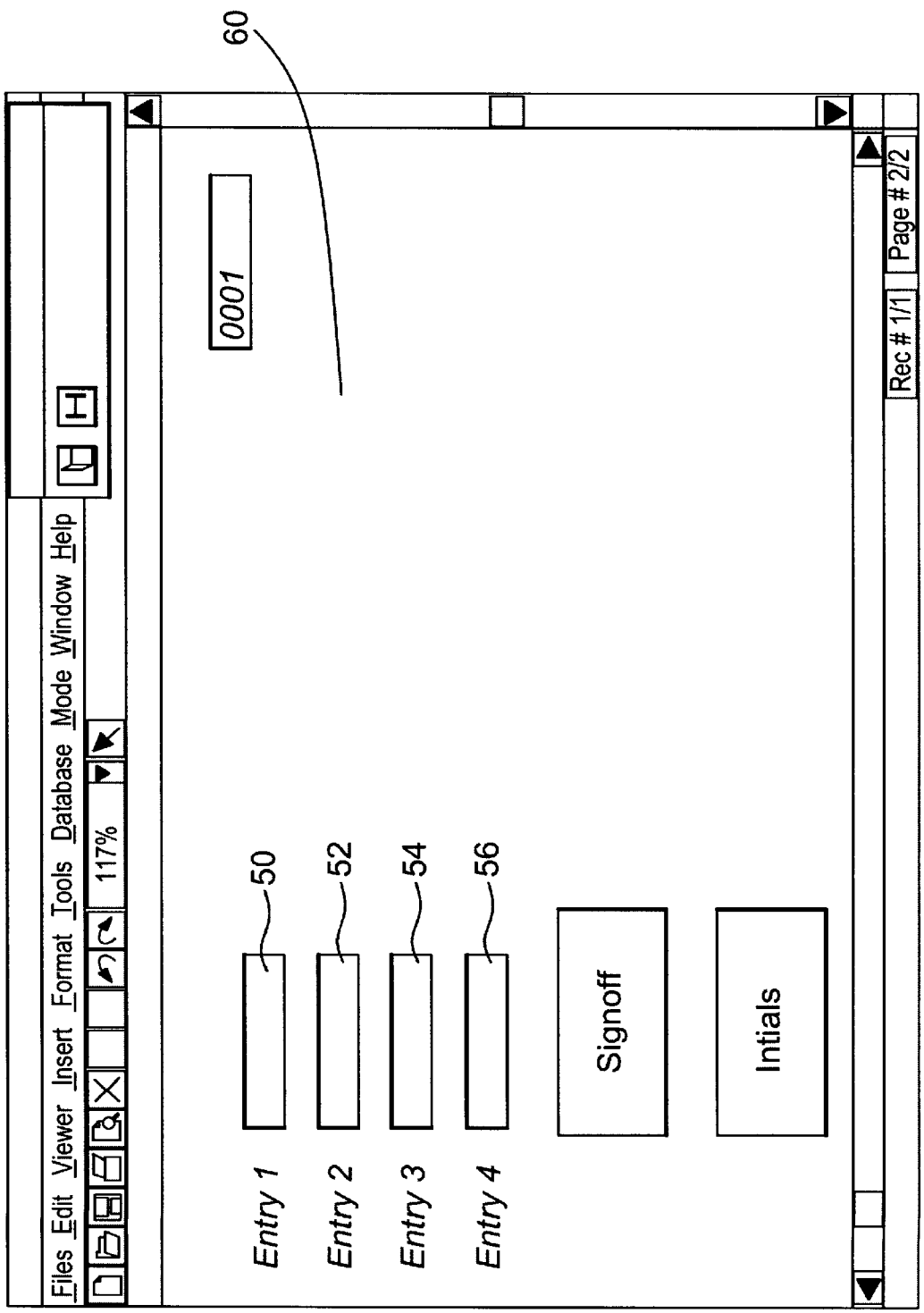
FIGS. 4 through 10 are printouts of the screens generated by the computerized form processing system of this invention relating to the automatic flagging of changes made to information entered in a field of a computerized form and the requirement that the user identification be linked to all such changes i.e. digital signatures or initials or some other regulatory compliant electronic signature.
Figure 5:
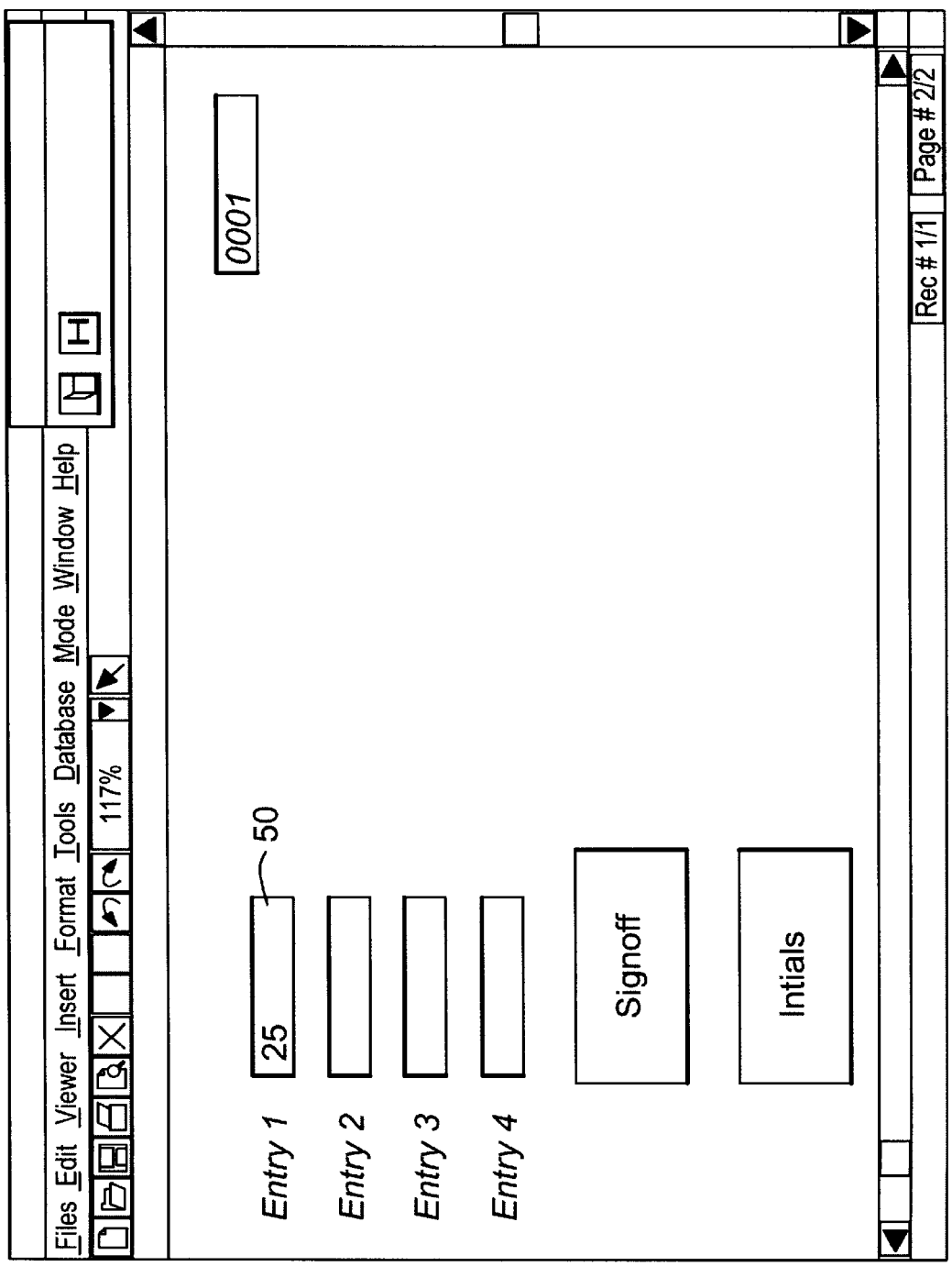

Data entry for a given form displayed on touch screen 22 begins with the user being presented with signature block 70, FIG. 3. Signature verification program 32, FIG. 2, then verifies that the signature is valid. Next, the user is presented with form 60, FIG. 4, including fields 50 through 56 and begins the data entry process by entering a value or any other required information as shown for field 50, FIG. 5. In this example, the user has entered the value "25." Also in this example, the user then changes the value of 25 in field 50, FIG. 6 to the value 27.

Figure 6:
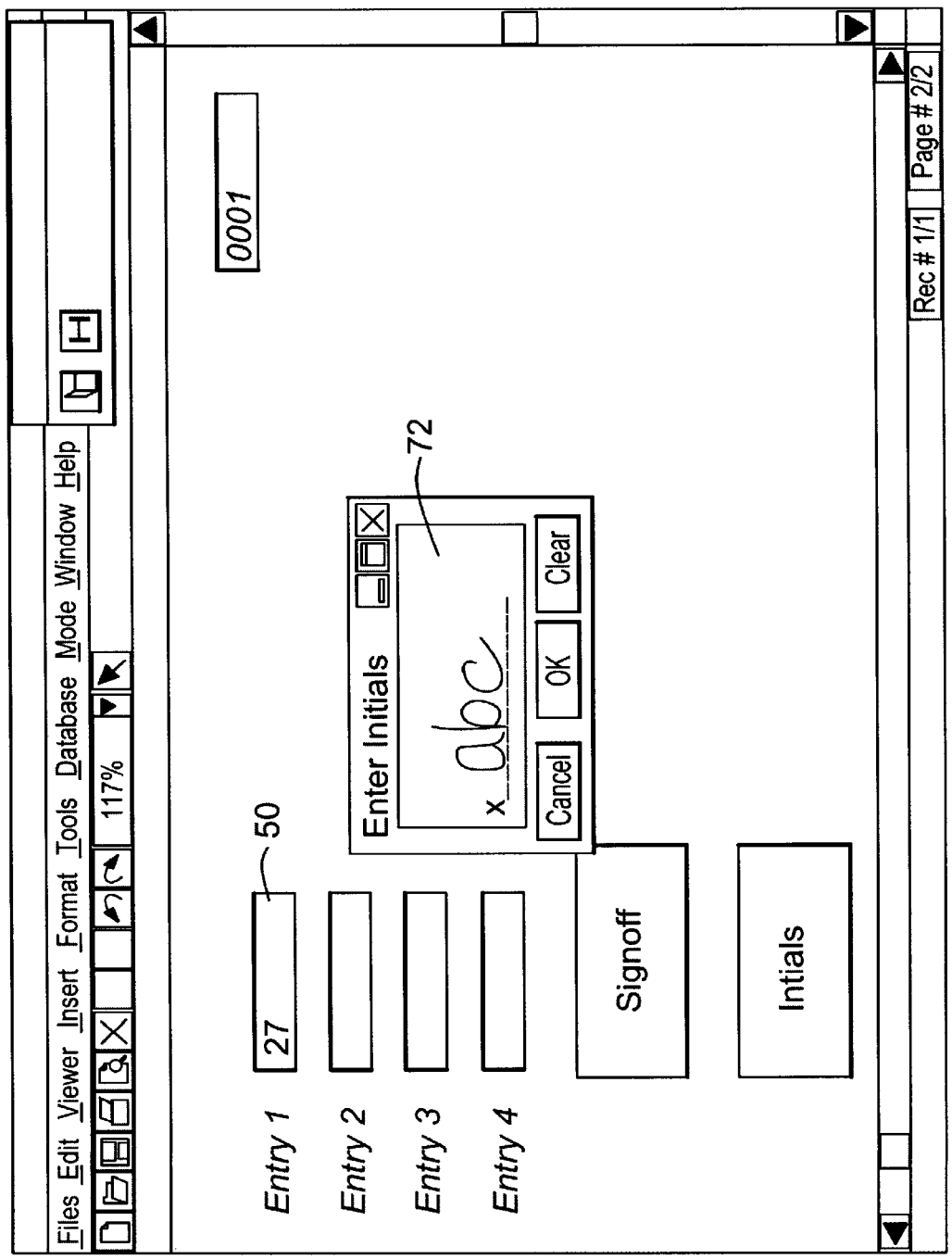
Figure 7:
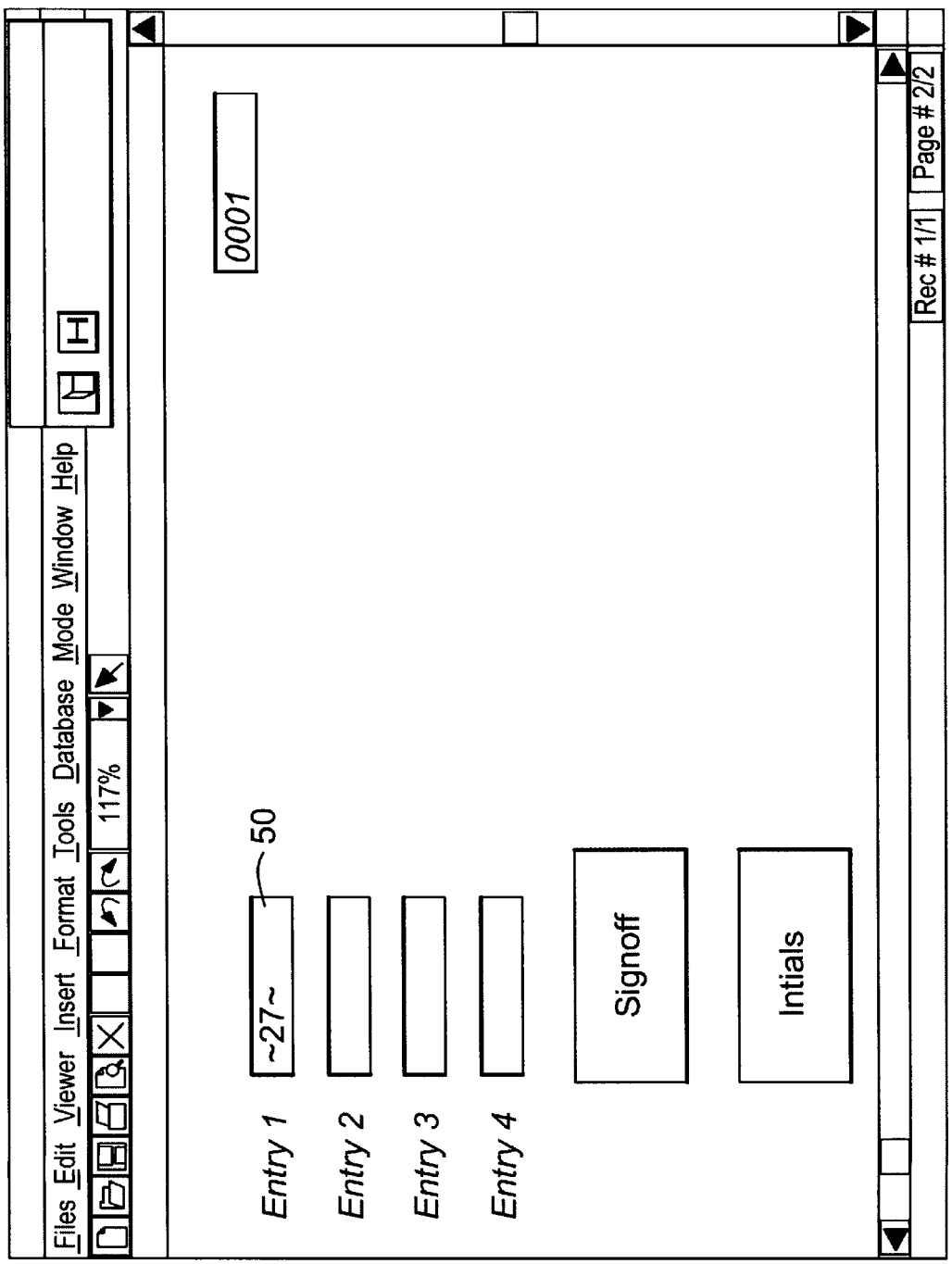

An application program of program block 28, FIG. 2, automatically monitors whether a change has been made and when it detects the change from 25 to 27 in field 50, FIG. 6, it displays signature block 72 to the user. The user then enters his or her initials as shown and in response the changed value 27 in field 50, FIG. 7 is flagged with tildes under the control of programming resident in application program block 28, FIG. 2. The requirement that the user enters his or her initials in block 72 and a signature in block 70, FIG. 3 can be a mere signature capture process wherein the signature and/or initials are not verified or a verification process wherein only pre-authorized individuals are allowed to effect changes or sign off on a given form.

Figure 8:
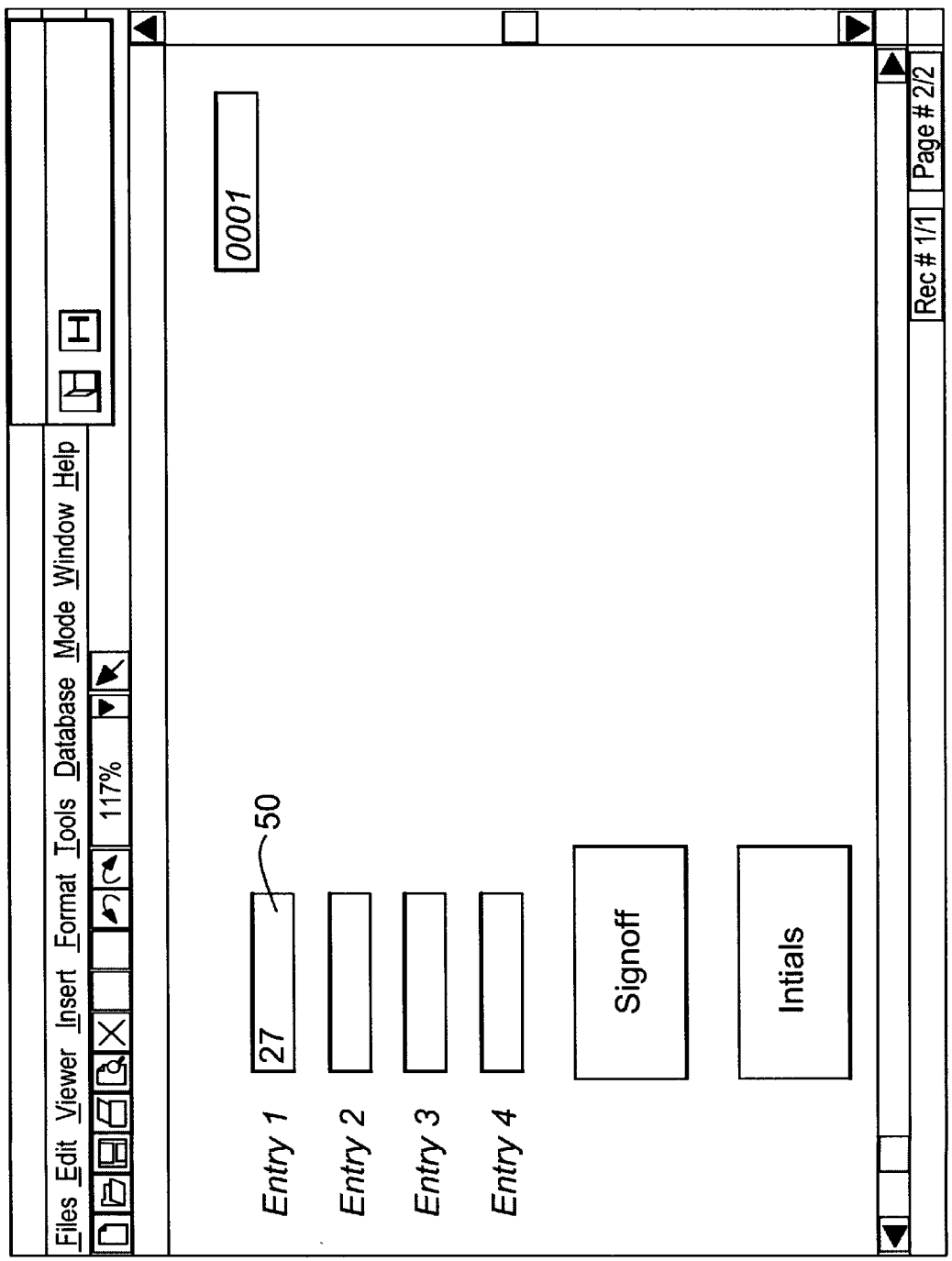
Figure 9:
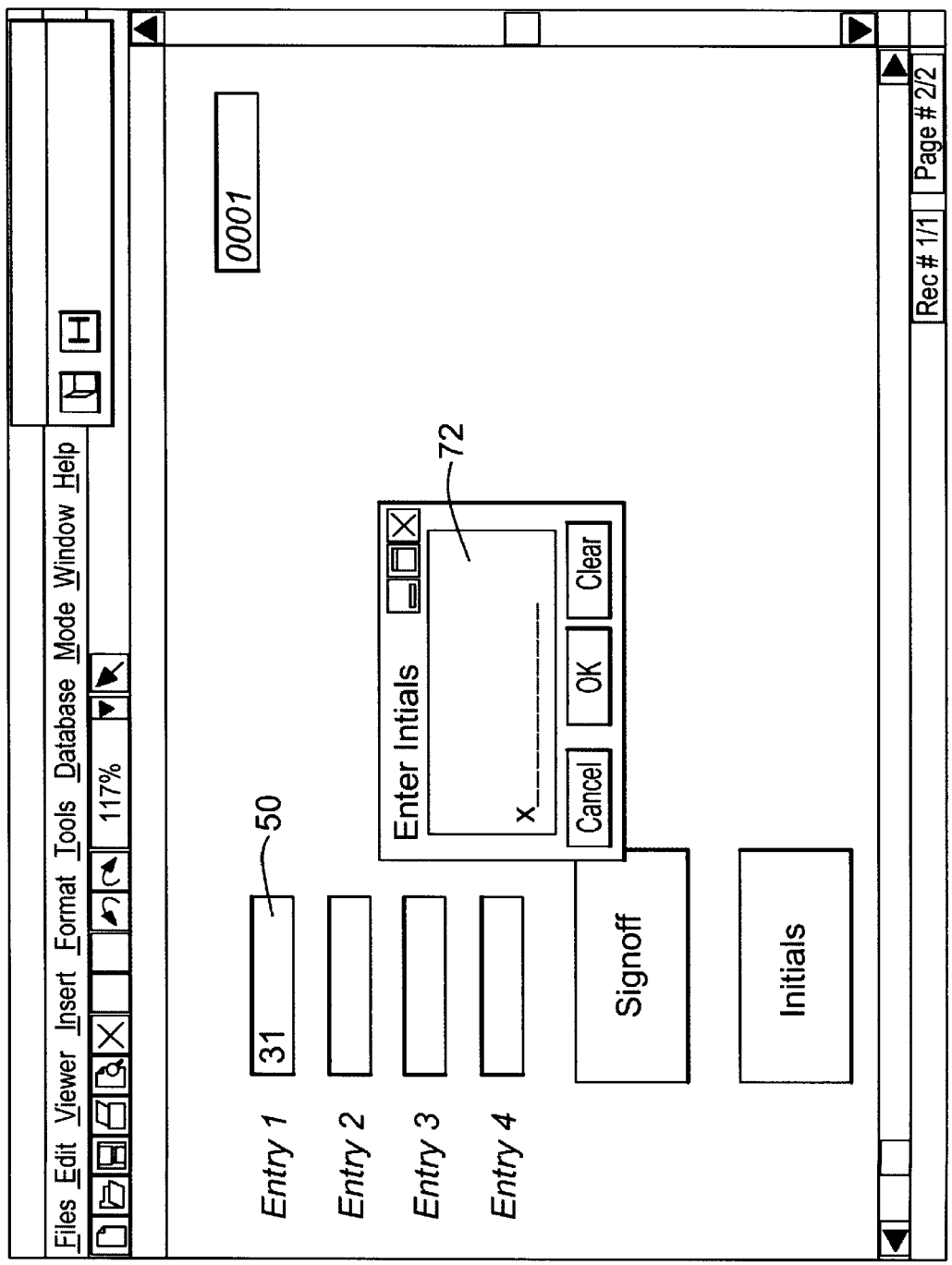
Figure 10:
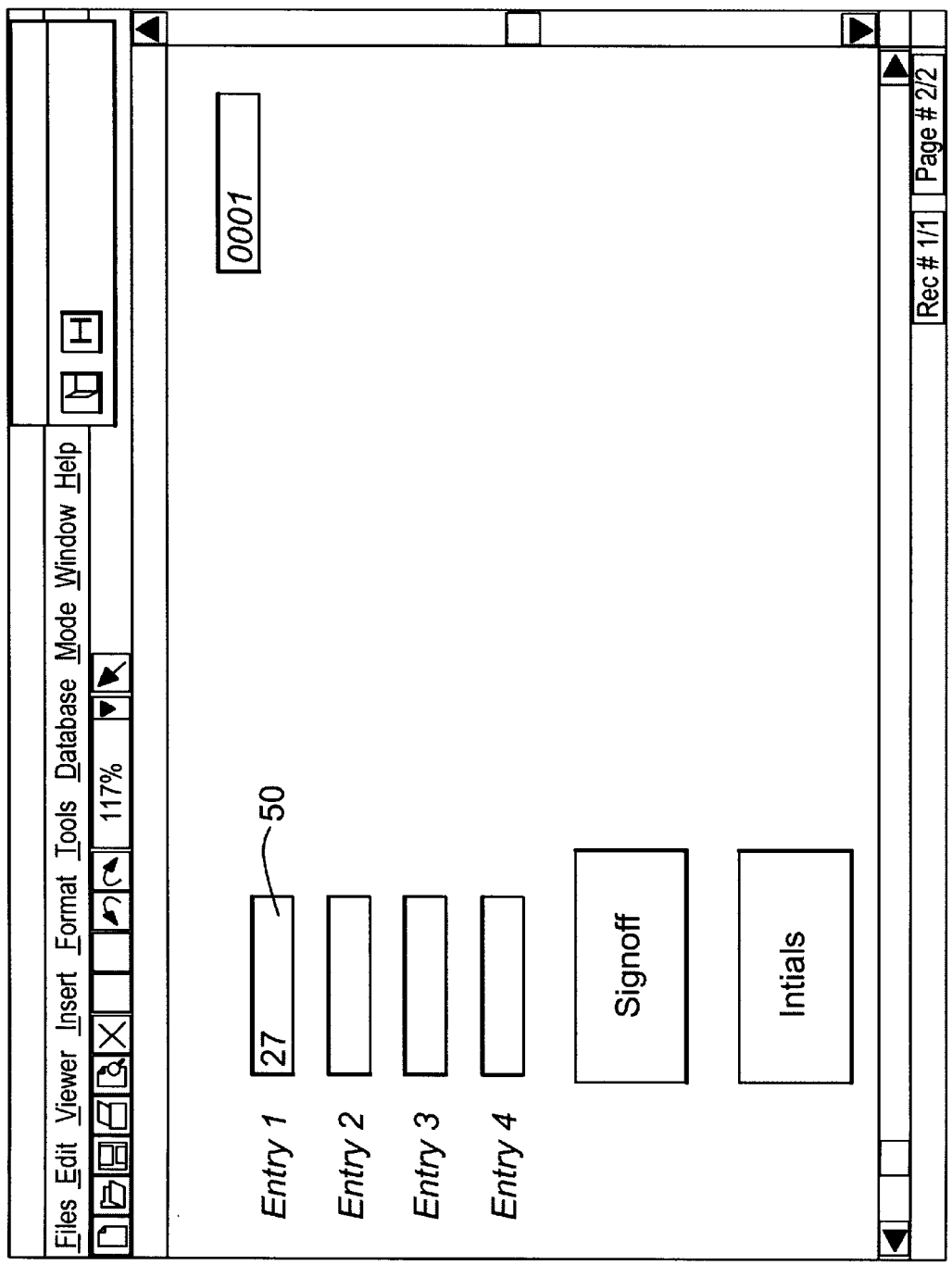
Figure 11:
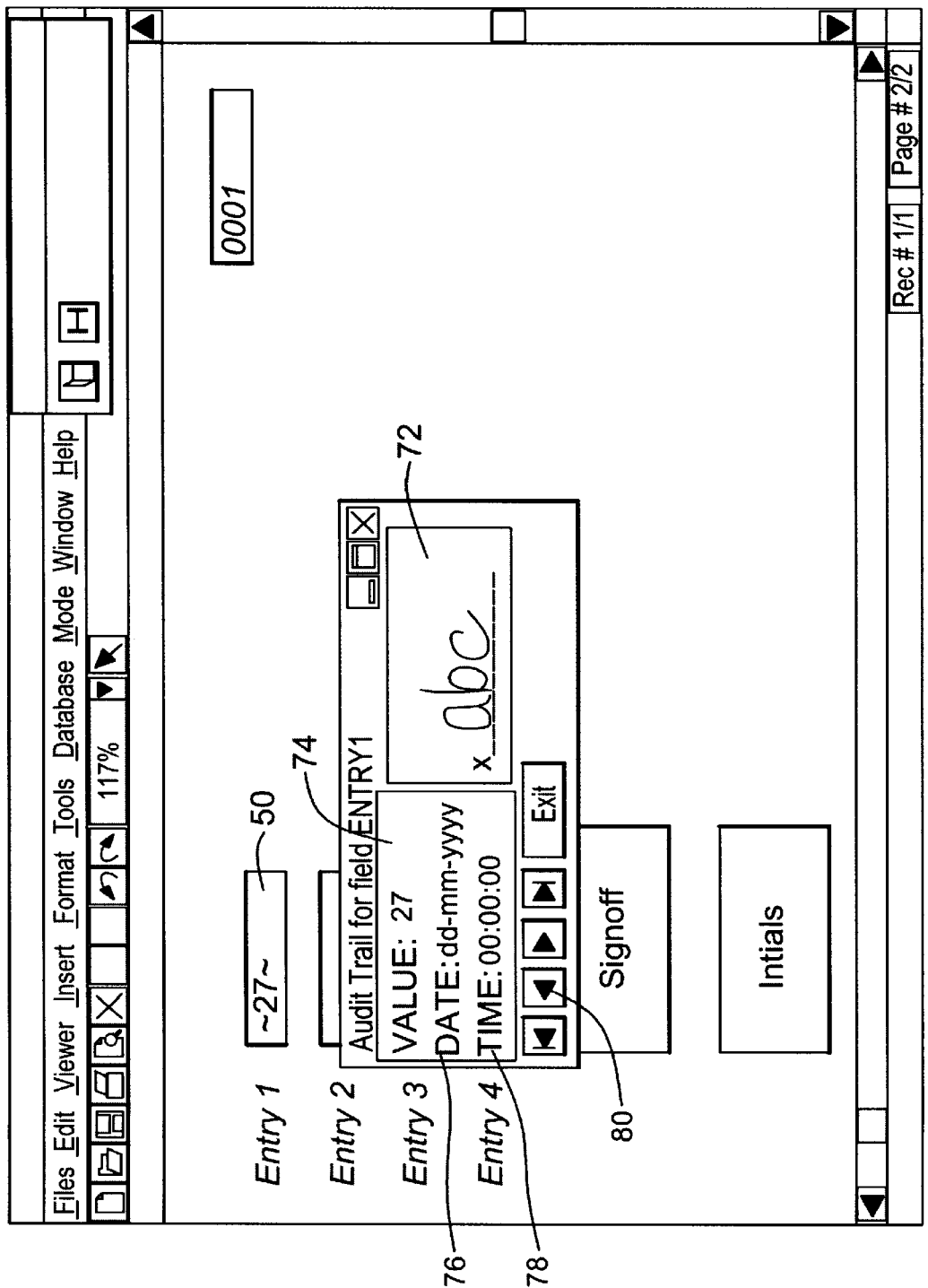
FIGS. 11 and 12 are printouts of the actual screens presented to the user of the computerized form processing system of this invention showing the audit functions performed in accordance with this invention.
Figure 12:
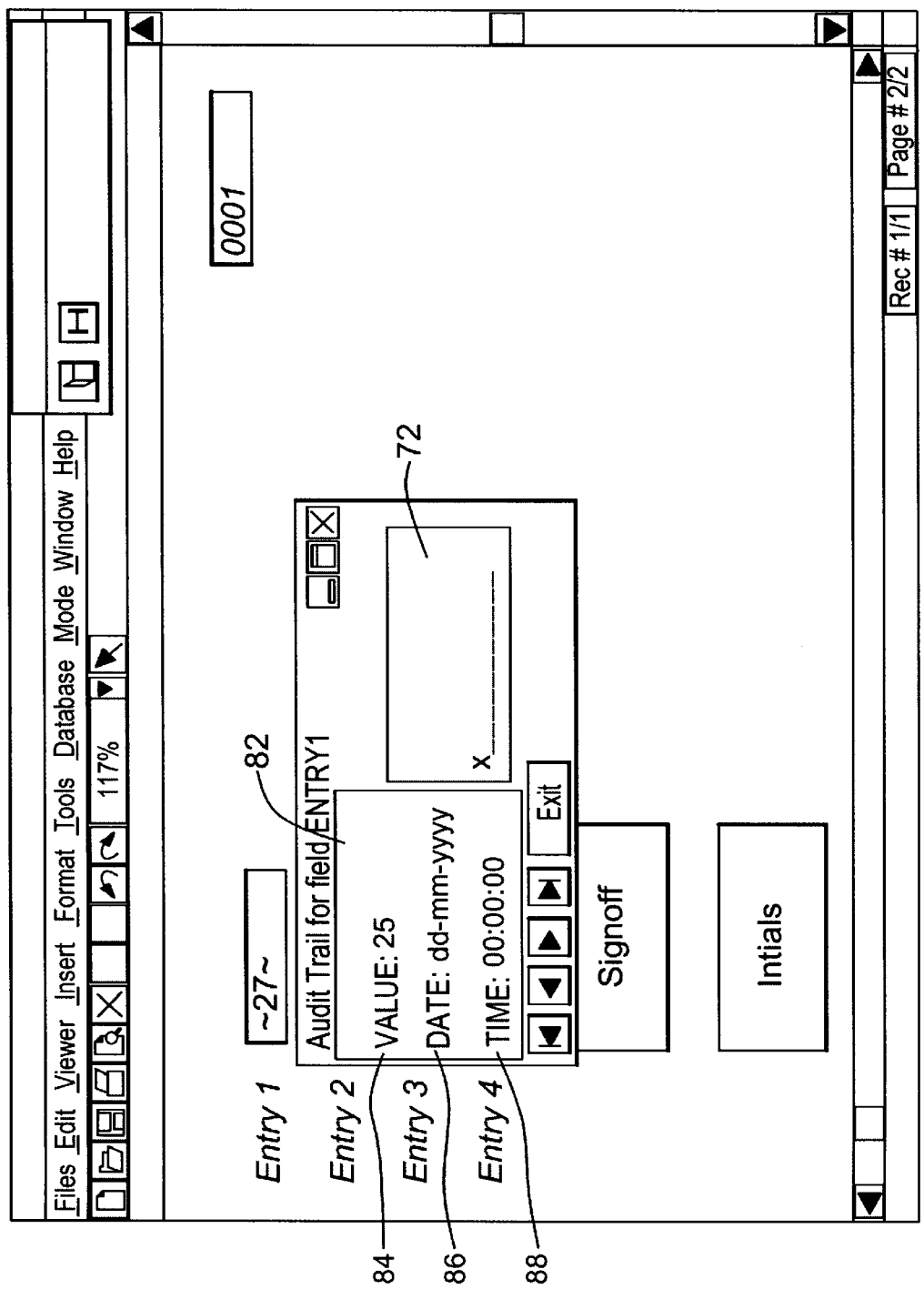

On the other hand, once an entry is made to field 50, FIG. 8, and a change is then made, FIG. 9, if the user does not initial or sign the change in signature block 72 or use an accepted electronic password, the value automatically reverts back to the original value as shown in FIG. 10.

All of this information is stored in database 26, FIG. 2. Then, when a computerized audit is performed, the auditor is presented with pop up screen 74, FIG. 11, which shows the stored information including the changed value of 27, the tildes which indicate that a change was made, and the user's initials in signature block 72 providing an indication of who made the change. Also included is the date and time information 76 and 78 regarding the entry of the changed value. By clicking back on arrow 80, the auditor is then able to view, on screen 82, FIG. 12, the original value of 25 as shown at 84 and the date and time information 86 and 88 indicating when the original value was entered. Since this was the initial value entered, there are no initials in signature block 72. Accordingly, if there were two changes instead of one, the auditor would be presented with a record of all changes and would understand whether a value entered is the original value by the lack of initials in signature block 72.

Figure 13:
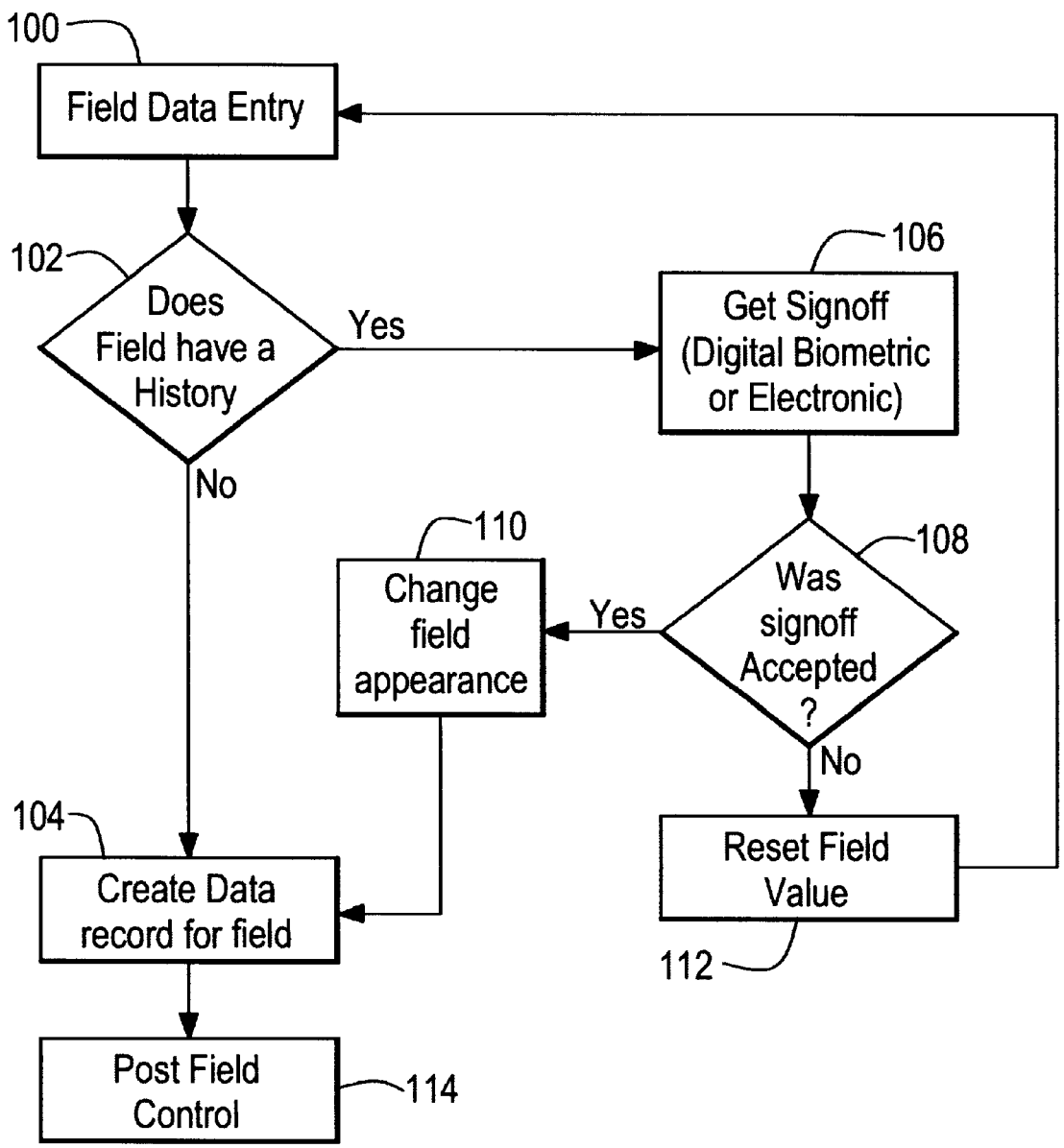
FIG. 13 is a flow chart of the computer programming of this invention which automatically flags the changed data, prompts the user for his or her initials or other FDA compliant indentifer, and which creates a data record for the changed data entered by the user.

The programming which implements the above described functions is shown in the flow charts of FIGS. 13 and 14. When data is entered into a field, step 100, a check is made to ascertain whether data has already been entered into that field, step 102. If not, a data record for that field is created, step 104, including the value entered, and the date and time the original value was entered. This processing corresponds to the original entry of the value 25 in field 50 shown in FIG. 5. If, on the other hand, it is determined in step 102 that the field has a history of one or more previous entries, a sign off request is generated, step 106 corresponding to the presence of signature block 72, FIG. 6 when the value of 25 was changed to 27 in field 50. If the sign off is accepted, step 108, FIG. 13, the field is flagged, step 110 by changing its appearance in some fashion, for example, by the tildes shown in field 50, FIG. 7. A new data record for that field is then created to show the new value entered, the date and time of the entry of the changed value, and the identity of the user who made the change which is derived from the signoff, step 104, FIG. 13. If the sign off is not accepted, step 108, the field value is reset to its previous value as shown at 50 in FIG. 10, step 112, FIG. 13. Processing then continues to post field control, step 114.

FIG. 14 describes the processing which occurs when a form record set is requested for output (e.g. printing) since electronic form software 30, FIG. 2 lacks the ability to review all the data records for any given form record set when producing an output file. In this invention, an output routine of application program block 28 automatically checks the history of each field when a print request is generated. When a print request is generated step 119, FIG. 14, object 160, FIG. 17 reviews each field in the file to determine whether there is a history (i.e. whether changes have been made), step 120, FIG. 14. If that field has a history, step 122, then a distinguishing mark is made to that data on the printed output, step 124. Again, tides may be placed in front of and in back of the data value. If no changes have been made, that field is added to the output file, step 126, and processing continues. Thus, the audit trail is visible right on the printed form unlike prior systems which required the generation of an exception report.

Figure 16:
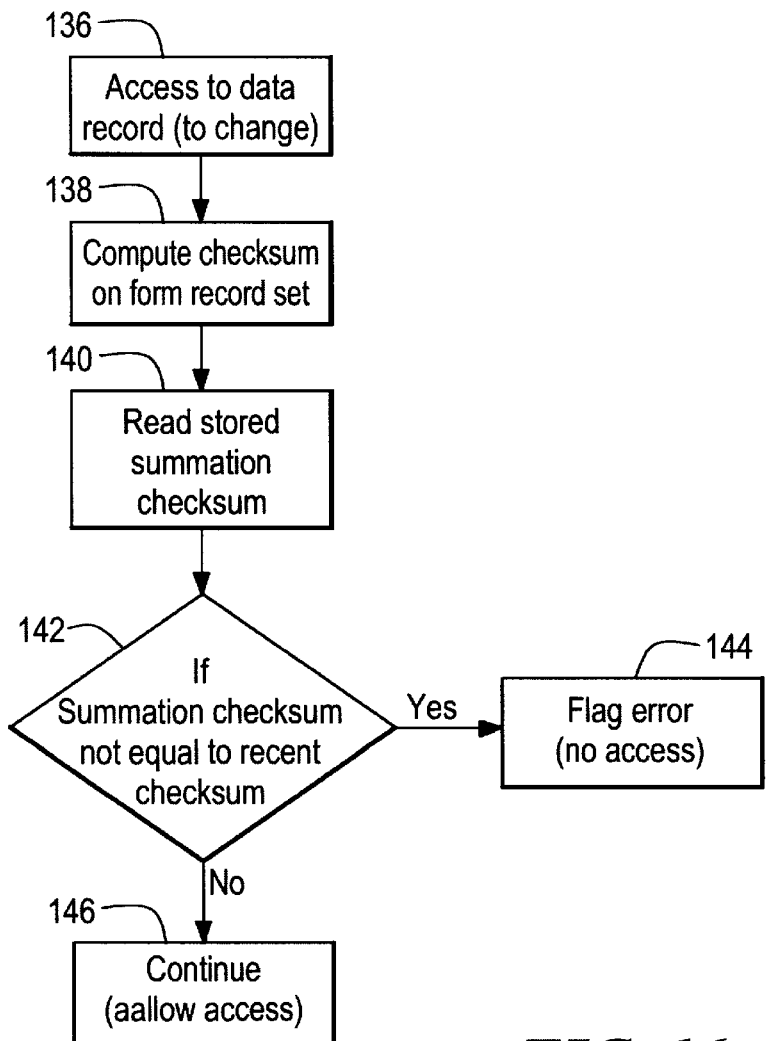

The programming of the checksum feature in accordance with this invention is discussed with reference to FIGS. 15 and 16. Field checksums are generated as each field record is created (a new checksum for each new field entry). The field checksum allows a change to any particular field record to be flagged. This function ensures that individuals do not change a record while the batch record is in process. Once the batch record is completed, the final checksum is calculated, however the individual field checksums will also be included in the batch record checksum (i.e. the batch record checksum is a conglomeration of all field records and their corresponding checksums). Thus, once a complete data record is entered, step 130, FIG. 5, a checksum of all the data entries entered in all the fields of the form is performed, step 132. This summation check calculation is made for all the individual field checksums and this checksum value is stored, step 134. Later, if there is access to and a change made to a data record, step 136, FIG. 16, the checksum routine is automatically performed again, step 138. That later checksum value is then compared to the previously stored checksum value, steps 140 and 142 and a flag is automatically generated if there is a change between the two checksum values, step 144 indicating a breach in the integrity of the stored data. If there is no change, the access to the form may have been for viewing purposes, data analysis purposes, or configuration control not related to data integrity and therefore processing would simply continue, step 146. One example of programming which implements the functions shown in FIGS. 13–16 is attached hereto as appendix A.

Figure 17:
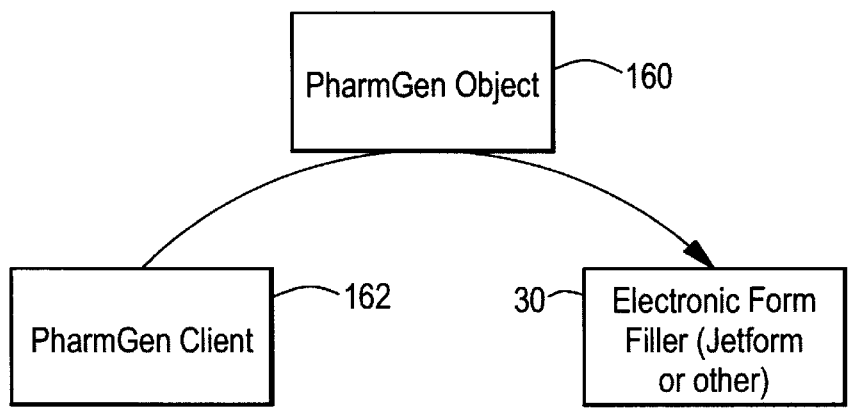
FIG. 17 is a block diagram depicting the separation of and the interaction between the form object and the client version of the computerized forms in accordance with this invention.

FIG. 17 describes the software architecture inside of system 20, FIG. 1, and shows the relationship between the electronic forms software 30 and the other components. The PharmGen Client 162, FIG. 17 launches PharmGen object 160, which is the software component that loads the electronic forms, checks the field history, captures signatures, creates a changes in field appearances, and interfaces with the database system. Electronic form filler 30 is controlled by object 160 and is the primary user interface to the form. Object 160 thus includes elements of application program block 28, FIG. 2 and signature verification programs 32.

Thus, system 20, FIG. 2 provides an improved computerized form processing system and method which automatically keeps track of all changes made to data entries in a computerized form and therefore complies with FDA requirements concerning data changes. System 20 automatically flags a changed entry and allows the user to link his or her FDA compliant identifier such as initials, digital signature or electronic signature to the change in accordance with the FDA's requirements. A clear audit trail of all data entry events associated with a paperless form is maintained and system 20 automatically verifies the integrity of stored completed forms. Printouts are provided to the reviewer and for filing which automatically include an indication of whether a value was changed without the need to request and generate an exception report.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A computerized form processing system comprising:
   a database for storing at least one form including one or more fields;
   a viewer for viewing a stored form;
   a data entry device for allowing a user to enter information into the fields of the form;
   a monitoring routine configured to actively monitor whether previously entered information in a field of the form is being changed by the user;
   a field modification verification routine configured to, on the viewer, prompt the user to sign off on any such change and which further stores and associates the user's sign off with the change, the field modification routine further configured to reset the change to the previously entered information if there is no user sign off; and
   an authorization routine configured to reset the change to the previously entered information if the user's sign off is not authorized.

2. The system of claim 1 further including a storage routine configured to automatically store, in the database, all information entered into a field.

3. The system of claim 1 in which said data entry device is a touch screen.

4. The system of claim 3 in which said data entry device includes a pen device.

5. The system of claim 1 in which said field modification verification routine is further configured to display a signature block on the viewer and verify that an entry is made to the signature block.

6. The system of claim 1 further including a summation check routine configured to perform a field summation check calculation for the information entered into each field of a form.

7. The system of claim 6 in which said summation check routine is further configured to perform a summation check calculation for the information entered into the form and further configured to store a checksum value of said information for monitoring changes made to completed forms.

8. The system of claim 7 in which said summation check routine is further configured to perform a final summation check calculation for all field summation check calculations.

9. The system of claim 1 further including an output routine configured to output a completed form.

10. The system of claim 9 in which said output routine is further configured to automatically flag on the output any changes to information entered into a field.

11. A computerized form processing system comprising:
    a database for storing at least one form including one or more fields;
    a viewer for viewing a stored form;
    a data entry device for allowing a user to enter information into the fields of the form;
    a monitoring routine configured to actively monitor whether previously entered information in a field of the form is being changed by the user; and
    a field modification verification routine configured to, on the viewer, prompt the user to sign off on any such change.

12. The system of claim 11 in which the field modification routine is further configured to store and associate the user's sigh off with the change.

13. The system of claim 12 in which the field modification routine is further configured to reset the change to the previously entered information if there is no user sign off.

14. The system of claim 13 further including an authorization routine configured to reset the change to the previously entered information if the user's sign off is not authorized.

15. A computerized form processing system comprising:
    a database for storing at least one form including one or more fields;
    a viewer for viewing a stored form;
    a data entry device for allowing a user to enter information into the fields of the form;
    a monitoring routine configured to actively monitor whether previously entered information in a field of the form is being changed by the user; and
    a field modification verification routine configured to store and associate a user's sign off with any such change.

16. The system of claim 15 in which the field modification routine is further configured to, on the viewer, prompt the user to sign off on any such changes.

17. The system of claim 16 in which the field modification routine is further configured to reset the change to the previously entered information if there is no user sign off.

18. The system of claim 17 further including an authorization routine configured to reset the change to the previously entered information if the user's sign off is not authorized.

19. A computerized form processing system comprising:
    a database for storing at least one form including one or more fields;
    a viewer for viewing a stored form;
    a data entry device for allowing a user to enter information into the fields of the form;
    a monitoring routine configured to actively monitor whether previously entered information in a field of the form is being changed by the user; and
    a field modification verification routine configured to reset the change to the previously entered information if there is no user sign off associated with a change.

20. The system of claim 19 in which the field modification routine is further configured to, on the viewer, prompt the user to sign off on any such change.

21. The system of claim 20 in which the field modification routine is further configured to store and associate the user's sign off with the change.

22. The system of claim 21 further including an authorization routine configured to reset the change to the previously entered information if the user's sign off is not authorized.

23. A computerized form processing system comprising:
    a database for storing at least one form including one or more fields;
    a viewer for viewing a stored form;
    a data entry device for allowing a user to enter information into the fields of the form;
    a monitoring routine configured to actively monitor whether previously entered information in a field of the form is being changed by the user; and
    an authorization routine configured to reset the change to the previously entered information if the user is not authorized.

24. The system of claim 23 further including a field modification verification routine configured to, on the viewer, prompt the user to sign off on any such changes.

25. The system of claim 24 in which the field modification routine is further configured to store and associates the user's sign off with the change.

26. The system of claim 25 in which the field modification routine is further configured to reset the change to the previously entered information if there is no user sign off.

27. A computerized form processing system comprising:
- a database for storing at least one form including one or more fields;
- a viewer for viewing a stored form;
- a data entry device for allowing a user to enter information into the fields of the form;
- a data entry verification routine configured to, on the viewer, prompt the user to sign off on any such entry and which further stores and associates the user's identification, date, and time with the entry, the data entry verification routine further configured to not accept the entry if there is no user sign off;
- a monitoring routine further configured to actively monitor whether previously entered information in a field of the form is being changed by the user;
- a field modification verification routine configured to, on the viewer, prompt the user to sign off on any such change and which further stores and associates the user's identification, date and time with the change, the field modification routine further configured to reset the change to the previously entered information if there is no user sign off; and
- an authorization routine configured to reset the change to the previously entered information if the user's sign off is not authorized.

28. The system of claim 27 in which said field modification verification routine is further configured to display a signature block on the viewer and verify that an entry is made to the signature block.

29. The system of claim 27 further including a summation check routine configured to perform a field summation check calculation for the information entered into each field of a form.

30. The system of claim 29 in which said summation check routine is further configured to perform a summation check calculation for the information entered into the form and further configured to store a checksum value of said information for monitoring changes made to completed forms.

31. The system of claim 27 further including an output routine configured to output a completed form.

32. The system of claim 31 in which said output routine is further configured to automatically flag on the output any changes to information entered into a field.

* * * * *